Figure 1:
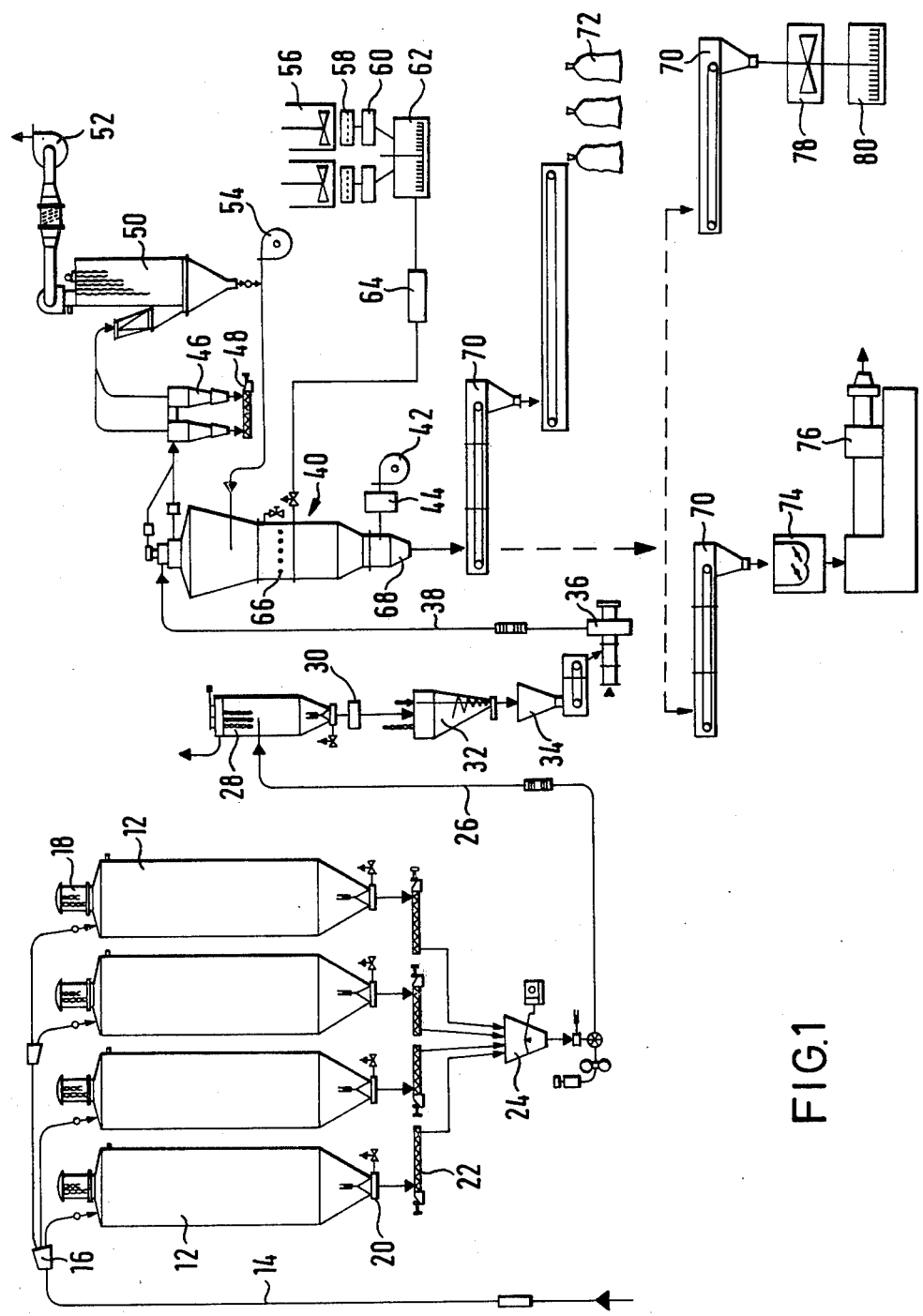

United States Patent [19]

Pfuhl et al.

[11] 4,315,879
[45] Feb. 16, 1982

[54] PROCESS FOR PREPARING STARTING MATERIALS TO FORM A CERAMIC COMPOSITION

[76] Inventors: Hans P. H. Pfuhl, Försterstr. 52; Dieter P. H. Agthe, Plössberger Weg 12; Diethard G. Kreiner, Naturfreundestr. 2, all of 8672 Selb, Fed. Rep. of Germany

[21] Appl. No.: 970,065

[22] Filed: Dec. 15, 1978

[30] Foreign Application Priority Data

Dec. 15, 1977 [DE] Fed. Rep. of Germany ....... 2756034

[51] Int. Cl.² .................. B02B 5/02; C04B 33/02; C04B 33/04
[52] U.S. Cl. .................. 264/117; 23/313 AS; 106/288 B; 501/1; 501/141; 501/155; 241/23; 241/25; 366/101
[58] Field of Search .......... 106/73.6, 39.5, 71; 366/101, 107; 241/25; 427/213; 23/313 R, 313 AS, 313 FB; 264/DIG. 69, 108, 117

[56] References Cited

U.S. PATENT DOCUMENTS

| 2,920,832 | 1/1960 | Duke | 241/23 |
|---|---|---|---|
| 2,926,079 | 2/1960 | Smith | 23/313 X |
| 3,207,824 | 9/1965 | Wurster et al. | 264/117 |
| 3,549,336 | 12/1970 | Hodel | 264/117 X |
| 3,558,758 | 1/1971 | Wendt et al. | 23/313 X |
| 3,584,097 | 6/1971 | Hellstrom et al. | 264/117 |
| 3,632,257 | 1/1972 | Ashizawa | 264/117 X |
| 3,803,283 | 4/1974 | Takewell et al. | 264/117 |
| 3,856,441 | 12/1974 | Suzukawa et al. | 264/117 X |
| 4,141,316 | 2/1979 | Grun | 427/212 |
| 4,146,676 | 3/1979 | Saeman et al. | 428/407 X |

FOREIGN PATENT DOCUMENTS

| 1231155 | 12/1966 | Fed. Rep. of Germany | 106/45 |
|---|---|---|---|
| 1294352 | 5/1969 | Fed. Rep. of Germany | . |
| 2655941 | 6/1978 | Fed. Rep. of Germany | 106/45 |

Primary Examiner—Helen M. McCarthy

[57] ABSTRACT

The process and installation for carrying out the process of preparing starting materials to form a ceramic composition by passing them through a crusher, storing them in silos, until different proportions are fed to a mixer and then to an intermediate silo from which the materials are pulverized, dried cleaned of ferrous impurities and passed through a spray tower where recycled and starting material are mixed and moisture content controlled depending on whether the ceramic mass or composition to which the granulated material is to be processed must be suitable for casting, kneading or pressing.

9 Claims, 2 Drawing Figures

PROCESS FOR PREPARING STARTING MATERIALS TO FORM A CERAMIC COMPOSITION

The invention relates to a process for preparing starting materials to form a ceramic composition adapted to be cast, kneaded or pressed, by using dissolved recycling material from the further processing of the composition.

It is already known to suspend the starting materials, namely hard raw materials, such as feldspar and quartz and soft raw materials, such as clay and kaolin, which are needed for the preparation of ceramic compositions in water and to process the suspension by spray drying to obtain granulated material having a residual moisture content of from 1 to 5%. The granulated material thus prepared by the raw material producer is mixed mechanically with recycled slip or slurry at the ceramics factories. The recycled slip is obtained by processing ceramic waste material having a moisture content of about 20% with water to form a suspension which contains about 38% of moisture. The mechanical blending of the granulated material with the recycled slip discontinuously yields a plastic mass which has a moisture content of from 18 to 24%, and this is processed in vacuum presses. This known process suffers from the essential disadvantage that suspending the starting materials and subsequently spray drying the suspension involves considerable energy consumption.

It is, therefore, the object of the invention to provide ceramic compositions in a manner which saves energy.

This object is met, in accordance with the invention, in a process of the kind defined initially by setting the starting materials, in finely ground and intermixed state, into motion of the kind of a fountain by means of a gas stream and adding the dissolved recycling material by spraying into the fountain.

The fountain may be created in a known spray container or vessel in which an upwardly directed gas stream puts the finely ground starting materials into a turbulent floating state and distributes them evenly over the cross section of a spraying zone. In the spraying zone starting material particles and drops of the dissolved recycling material introduced at that location by spraying become joined and form mixed agglomerates. It is characteristic of this process that the liquid becomes enveloped by solid matter so that the process yields an intermediate product which is dry at the surface of the agglomerates and does not stick together.

Compared with the known procedure of suspending and spray drying the starting materials, the invention permits a reduction of the amount of water used since it is only the recycle material which is dissolved, while the fresh starting materials remain more or less dry until the dissolved recycling material is introduced by spraying. The proportion of fresh starting materials in the solids content of the finished ceramic composition, on the average, is about 50% because in most ceramics manufacturing processes the reusable waste material to be recycled into the process can be expected to amount to 50%.

The starting materials may be subjected individually to fine grinding or comminuting and then mixed with one another in a gas stream which is generated upstream of the fountain. Various mechanical pulverizers or mills are known for the fine comminution of ceramic starting materials and, essentially, they have proved to be useful.

Yet such crushing machinery is subject to a certain extent of wear which may cause impurities in the pulverized material.

For this reason another embodiment of the process according to the invention is preferred which provides for mixing the starting materials in coarse granular state and then subjecting them together to fine comminuting in an air jet impact pulverizer. Such pulverizers, which may operate with counter-currents or with currents in the same direction and which are known per se, are used, in accordance with the invention, to suck in a continuously supplied mixture of coarse granular starting materials by means of injectors operating with compressed air or superheated steam, and to accelerate the mixture to a high speed so that the coarse granular dry and moist hard are soft substances of which the starting materials are composed are bombarded against one another whereby they are comminuted into a fine state which can be regulated.

Preferably, the mixed starting materials are subjected to fine grinding in a counter-current impact pulverizer and sifted. As is known, such pulverizers have a milling section with two opposed injectors which draw in the material to be crushed and accelerate it to speeds as high as 100 m/sec. for instance. The resulting jets of a mixture of compressed air or hot steam and solids are directed for head-on collision. The solids particles thus become crushed merely by colliding with other solids particles rather than with mechanically moved elements, as in certain other impact mills. The preferred embodiment of the process according to the invention thus prevents the starting materials from receiving impurities by wear of the mill.

If the process according to the invention is to be used to produce a ceramic composition suitable for casting and having a final moisture content of about 34 to 40%, preferably this is realized by spraying into the fountain thus obtaining a ceramic composition with a moisture content which ranges from 15 to 25% and giving it its final moisture in a subsequent known process step.

If, on the other hand, a ceramic composition suitable for pressing and having a final moisture content of about 1% is to be produced by the process according to the invention, this is preferably done by spraying into the fountain to thereby produce a granulated material with a moisture content ranging from 6 to 12%, drying this granulated material subsequently, while still in the fountain, by blowing in warm air so as to reach a residual moisture content of 3 to 6% and then further drying it in a known process step.

The dissolved recycling material may be composed of normal waste material from the production prior to the burn, of crushed fired bodies, and of dissolved clays.

Figure 2:
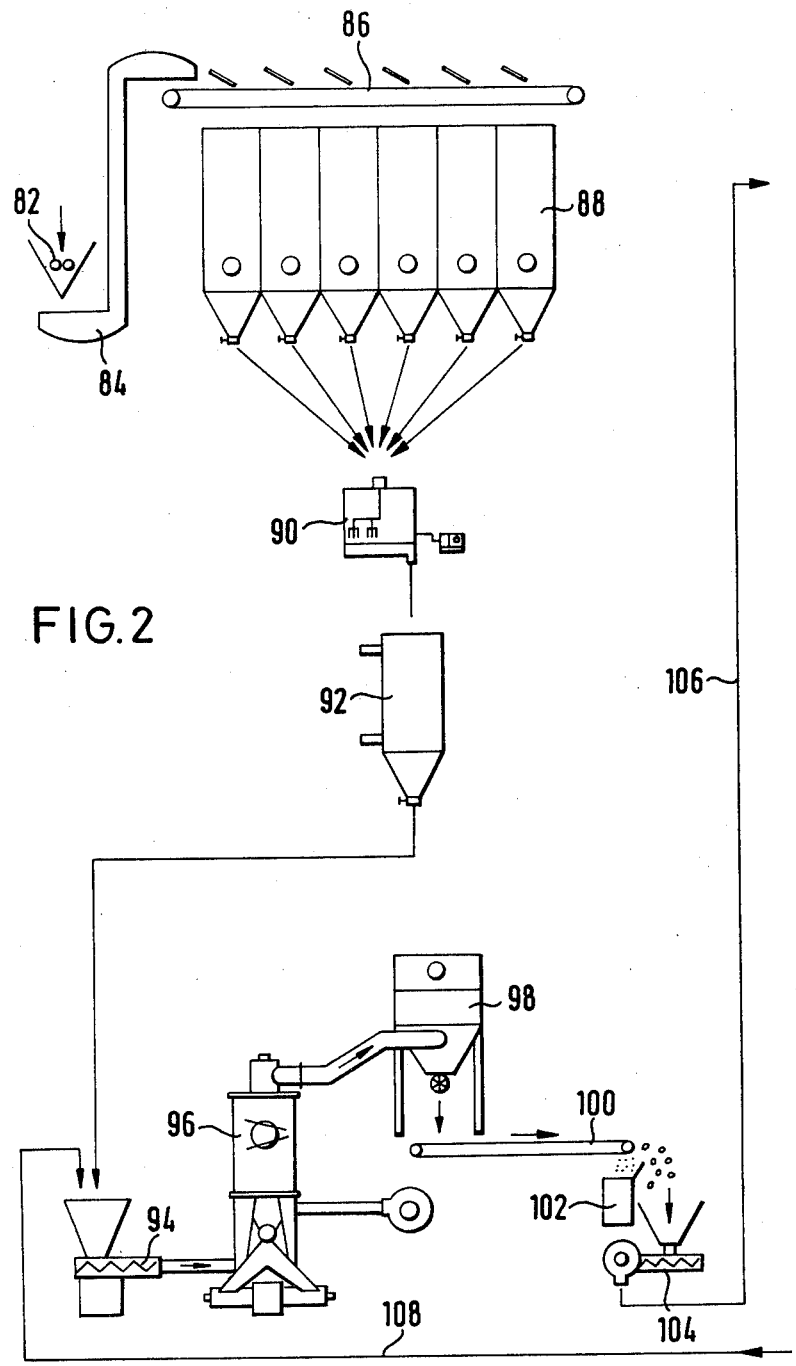

The invention will be described further, by way of example, with reference to the accompanying drawings which show several embodiments of installations for carrying out the process according to the invention and in which:

FIG. 1 shows a first embodiment of an installation for carrying out the process according to the invention in three variants, and FIG. 2 shows a modified embodiment of those parts of the installation according to FIG. 1 which serve to carry out the first process steps.

The installation as shown in FIG. 1 comprises a plurality of storage bins or silos 12 serving as containers for the storage of starting components or materials obtained by fine dry crushing methods and having a degree of fineness or particle size which, for example, corresponds to 10,000 mesh/cm² (wire mesh: 0.06 mm according to DIN (German industrial standard)—oversize particles 3-5%). From left to right in the drawing, the individual silos may contain such starting materials as feldspar in the first one, quartz in the second one, clay in the third, and kaolin in the fourth silo. The silos 12 are adapted to be charged through a pneumatic supply line 14 and switches 16, and they each include a filter 18 at the top and a controllable outlet 20. A proportioning or metering screw 22 each is arranged below each outlet 20 to pass the respective starting material to a container type scale 24. The starting materials are then conveyed in batches, as composed by the container type scale 24, through a feed pipe 26 to an air mixer 28 where they are blended or mixed in batches. The starting material mixture, hereinafter simply referred to as starting material, is fed through a magnetic separator 30 into a storage vessel 32, and from the storage vessel it is supplied continuously by way of a metering conveyor type scale 34, a centrifugal blower 36, and another feed pipe 38 to a spray column or tower 40. The spray tower 40, for instance, may be of the kind sold under the designation SPRUMIX by the Babcock-BSH Aktiengesellschaft, of D-6430 Bad Hersfeld, West Germany.

A low pressure blower 42 is connected through an air heater 44 to the lower part of the spray tower 40. The upper part of the spray tower 40 is connected through a separator 46 with an associated metering screw 48 and through a filter 50 disposed downstream of the separator 46 to a suction fan 52. A high pressure blower 54 is provided to return the separated dust to the spray tower 40.

Recycling material in the form of waste from the further processing of ceramic compositions and/or crushed fired bodies and/or fresh clays, and/or further additives are mixed with water by means of agitators or twirling sticks 56 and passed through screens 58 and magnetic separators 60 to a stirring device or agitator 62. From the agitator 62 the mixture is fed by a metering pump 64 and introduced by a ring of nozzles 66 arranged at the spray tower 40 into the interior of the spray tower whereby the dissolved or suspended recycling material plus any admixed substances is sprayed on the pulverized starting material. As the starting material forms a kind of fountain inside the spray tower 40, the recycling material sprayed into the tower is finely distributed over the starting material so that together they form granulated material. The supply of liquid recycling material to the spray tower 40 is controlled such that the resulting granulated material will have a moisture content between approximately 6 and 25%, depending on whether the ceramic mass or composition to which the granulated material is to be processed must be suitable for casting, kneading or pressing. It is possible to interrupt the supply of dissolved or suspended recycling material and dry the granulated material to a moisture content between 6 and 12% by introducing warm air from the blower 42 through the air heater 44. The resulting granulated material passes through a pivoted double flap 68 on to a conveyor belt 70.

The finished granulated material then is filled into bags or sacks 72 or passed on to a screen type kneader or masticator 74 in which it is processed to a kneadable mass to be delivered to a vacuum press 76, or it is mixed by a twirling stick 78 with further liquid, for instance, further dissolved or suspended recycling material and then supplied to an agitator 80 producing a ceramic composition ready to be cast, depending on the envisaged further use.

The installation described above and shown in FIG. 1 essentially is known from German Pat. No. 12 94 352 to which reference is made for any further details.

The improved variant embodiment shown in FIG. 2 relates to those parts only of the installation according to FIG. 1 which are disposed upstream of the spray tower 40. According to FIG. 2 the processing of the individual starting materials begins in a roller type breaker or similar crusher 82 comminuting the raw starting materials, of a particle size of from 4 to 10 mm, with which it is fed, down to a mean particle size of 4 to 5 mm. The crusher is also adapted to pre-crush fired bodies from a ceramics manufacturing process so that these may be processed together with fresh starting materials.

The coarsely ground starting materials are conveyed by a bucket elevator 84 to a movable conveyor belt 86 to be subsequently stored separately in a series of silos 88. From the contents of the silos 88 batches of different proportions of the various starting materials are composed, as required, and passed to a mechanical mixer 90. Upon pre-mixing in the mixer 90 the individual batches are drained into a preliminary or intermediate silo 92. Conveniently, intermediate silo 92 is provided with a filling level indicator connected to a process control computer which controls the outlets of silos 88 and mixer 90.

The mixture of starting materials stored in intermediate silo 92 is transported by a screw conveyor 94 to an air jet pulverizer or impact mill 96, such as a countercurrent impact pulverizer, type Majac by Messrs. Donaldson Europe S.V., European Central Office, Interleuvenlaan 1, B-3044 Leuven, Belgium. This impact mill 96 effects fine comminution of the starting materials and renders them homogeneous while at the same time, drying them by the air stream introduced from an initial moisture content of, for instance, from 10 to 15% to a final moisture of 1 to 3%. The upper part of the impact mill 96 includes an air sifter which guarantees that only starting material having a particle size of less than 90 μm (90/1000 mm) will leave the mill.

The very finely ground starting material mixture is passed from the air jet impact mill 96 through a filter 98 to a cleaning section 100 where any ferrous impurities are separated by magnetic separators. If the mixture contains such impurities, they do not come from the air jet impact mill 96 but instead have been entrained by one or the other of the starting materials.

The ferrous impurities are discharged into a waste silo 102, whereas the purified, very finely comminuted starting material mixture is transported by a metering screw or any other mechanical conveying mechanism 104 and a pneumatic conveyor 106 to the spray tower 40 shown in FIG. 1. In the spray tower and in the sections downstream of the same the further process takes place, in consideration of the desired degree of humidity or moisture of the ceramic composition, in the manner described with reference to FIG. 1. Any residual material in the form of dust or granules produced in those parts of the installation may be returned to the air jet impact mill 96 through a line 108 and the screw conveyor 94.

What is claimed is:

1. A process of producing mixed heterogeneous agglomerates of ceramic materials for ceramic compositions to be cast, kneaded or pressed, which agglomerates constitute wet interior portions enveloped by solid material dry at the surface, said heterogeneous agglomerates comprising about 6-25% water, the process comprising:

suspending finely ground ceramic starting materials in a gaseous stream and spraying the gaseous-solids mixture in a turbulent floating state uniformly over the cross-section of a spraying zone;

spraying droplets of dissolved or suspended recycling material constituting a water slurry of ceramic particles, from further processing of the ceramic composition, into said spraying zone to contact said gaseous-solids mixture in the turbulent state; thereby enveloping said droplets with said finely ground ceramic material and forming said mixed heterogeneous agglomerates having dry surfaces; and maintaining the ratio of finely ground ceramic material to droplets of slurry to ensure that said heterogeneous agglomerates comprise about 6-25% water.

2. A process as claimed in claim 1, characterized in that the starting materials are finely ground individually and subsequently mixed with one another in a gas stream provided upstream of spraying zone.

3. A process as claimed in claim 1, characterized in that the starting materials are mixed with one another in coarse granular state and subsequently finely ground together in an air jet impact mill upstream of the spraying zone.

4. A process as claimed in claim 3, characterized in that the mixed starting materials are finely ground in a counter-current impact pulverizer and sifted.

5. A process as claimed in one of claims 1 or 2 for producing ceramic compositions adapted to be cast and having a final moisture of from about 34 to 40%, characterized in that, by spraying into the spraying zone, a ceramic composition of a moisture content of only 15 to 25% is obtained, which composition is given its final moisture in a subsequent known process step.

6. A process as claimed in one of claims 1 or 2-4 for producing a ceramic composition adapted to be pressed and having a final moisture of about 1%, characterized in that, by spraying into the spraying zone a granulated material having a moisture content of from 6 to 12% is obtained, which material is subsequently dried while still in the spraying zone by blowing in hot air to reach a residual moisture of from 3 to 6%, and is then dried further.

7. A process as claimed in claim 1 characterized in that the recycled slurry is composed of normal waste material of the production prior to the burn, of crushed fired bodies, and of dissolved clays.

8. A process as claimed in claim 1 for the production of ceramic compositions adapted to be cast and having a final moisture of from about 34 to 40%, characterized in that, by spraying into the spraying zone, a ceramic composition of a moisture content of only 15 to 25% is obtained, which composition is given its final moisture in a subsequent known process step, and further characterized in that the dissolved recycling material is composed of normal waste material of the production prior to the burn, of crushed fired bodies, and of dissolved clays.

9. A process as claimed in claim 6, characterized in that the dissolved recycling material is composed of normal waste material of the production prior to the burn, of crushed fired bodies, and of dissolved clays.

* * * * *